United States Patent [19]

Kinnaird et al.

[11] 4,014,485
[45] Mar. 29, 1977

[54] GAS COOLING SYSTEM FOR HYPERSONIC VEHICLE NOSETIP

[75] Inventors: Laird D. Kinnaird; Seth B. Moorhead, Jr., both of Orlando, Fla.

[73] Assignee: Martin Marietta Corporation, Orlando, Fla.

[22] Filed: Apr. 14, 1975

[21] Appl. No.: 567,673

[52] U.S. Cl. .......................... 244/117 A; 102/105; 244/163
[51] Int. Cl.² .......................................... B64C 1/38
[58] Field of Search .......... 244/117 A, 117 R, 163; 60/265, 266, 270 S; 102/105, 49.7

[56] References Cited
UNITED STATES PATENTS

| | | | |
|---|---|---|---|
| 3,028,129 | 4/1962 | Faillie | 244/117 A |
| 3,253,405 | 5/1966 | Kropa | 60/265 X |
| 3,267,857 | 8/1966 | Lindberg, Jr. | 102/105 |
| 3,277,825 | 10/1966 | Maillard | 102/49.7 |
| 3,410,502 | 11/1968 | Leadon et al. | 102/105 X |
| 3,754,511 | 8/1973 | Damon et al. | 60/270 S X |
| 3,785,591 | 1/1974 | Stalmach, Jr. | 102/105 X |

Primary Examiner—Trygve M. Blix
Assistant Examiner—Barry L. Kelmachter
Attorney, Agent, or Firm—Julian C. Renfro; Gay Chin

[57] ABSTRACT

A cooled nosetip arrangement for a vehicle designed to travel at hypersonic velocities is taught herein. We provide a nosetip having one or more orifices at its forwardmost location, but instead of utilizing an arrangement for expelling a liquid coolant, which would necessitate a considerable amount of plumbing and tankage, we utilize a novel gas generator arrangement enabling a coolant gas to be selectively generated and then expelled from such nosetip orifice(s). In this manner we utilize a coolant that advantageously remains in a chemical form until it is to be actually utilized.

12 Claims, 7 Drawing Figures

GAS COOLING SYSTEM FOR HYPERSONIC VEHICLE NOSETIP

BACKGROUND OF THE INVENTION

As vehicles such as rockets and the like exceed supersonic speed and approach and assume hypersonic speed, generally defined as speeds in excess of Mach 5, they encounter what has been termed the "heat barrier," which is a complex atmospheric condition wherein considerable heat conditions are imposed upon the craft sufficient to rapidly melt, and/or vaporize most known materials at an extremely rapid rate in a manner similar to the burning and destruction of meteors. To enable such a craft to survive this thermal barrier, it must absorb or dissipate this heat while maintaining its structural strength.

One conventional solution to this heating problem is to employ high melting point or burning temperature materials in sufficient thicknesses that despite progressive erosion of the body from its outer surface inwardly, a portion of the body remains after a limited time exposure to this environment in a manner similar to the survival of small portions of large meteors that pass through the atmosphere.

Still another conventional solution is the use of liquid coolants such as water expelled from the vehicle in such a manner as to coat the surface and form a protective layer that is continuously replenished. However, these possible solutions are unsatisfactory both in failing to survive some extremely severe temperature environments, and in requiring an associated structure that is of such considerable bulk, thickness, and weight as to be unsatisfactory, if not prohibitive for certain applications. Similarly, in many applications such as rocket engines, turbine blades and other mechanical, chemical, and electrical uses, great heating and erosion environments are encountered, placing progressively greater demands that are not satisfied by known materials.

In contrast with such heavy, bulky arrangements of the prior art, we have designed a unique cooling system involving a nosetip made of impact resistant refractory material, in which one or more orifices are provided for the outward flow of coolant, but instead of utilizing a liquid coolant, with its accompanying tankage and weight, we have instead provided a highly advantageous and compact arrangement wherein the coolant is carried in a chemical form until a time just prior to its intended use.

SUMMARY OF THE INVENTION

In accordance with this invention, we have provided a nosetip utilizing one or more orifices from which coolant can evolve at a high rate, and in quantities sufficient to bring about a very effective cooling of the nosetip. Connected to these orifice means is a duct for the transport, on occasion, of gases evolved in a gas generator carried inside the vehicle. As will be seen, this duct not only serves as a gas transport means, but also it serves to connect the pressures encountered at the nosetip to the gas generator, to modulate its performance in a very desirable way.

The gas generator in accordance with this invention utilizes a solid propellant that burns at a predictable rate, and which supplies gases through the aforementioned duct to the nosetip. Although the solid propellant burns at a temperature between 1600° F and 2400° F and therefore supplies gases in the vicinity of 2000° F, these gases can be regarded as coolant gases in the environment of the nosetip, which is uncooled would easily reach a temperature of 6000° F or higher at hypersonic velocities. Our nosetip is made of material such as an alloy of tungsten, that possesses high structural integrity at temperatures well above the 2000° F coolant temperature, so it is therefore not jeopardized by the gases supplied from the gas generator.

In a typical flight trajectory, such as a vehicle reentering the atmosphere at velocities exceeding 10,000 feet per second, a shock wave is formed in front of the nosetip, and the temperature and pressure of the air in the area behind the shock wave contains enough energy to cause ignition of the gas generator at an appropriate time. Because of safety and reliability considerations, a preferred embodiment for the utilization of local environment for initiating the gas generator involves allowing the temperature associated with the shock layer air to be transmitted to the solid propellant at the time in the trajectory when coolant for the nosetip is required. Inasmuch as typical solid propellant gas generators have an auto-ignition temperature in the vicinity of 700° F to 800° F, it is quite effective to allow the ram air to bring about ignition of the solid propellant. Alternatively, the gas generator may be ignited on command by an electrical initiator.

Significantly, the gases evolved from the gas generator in accordance with this invention emanate from the orifice means at high velocity, which serves to push the bow shock away from the nosetip and thereby serves to increase the thickness of the boundary layer in a particularly advantageous manner.

It is known that as a flight vehicle proceeds through the atmosphere, it is normally slowed down by drag forces, with the pressure at the nosetip, the heating rate and consequently the coolant flow requirements rising and then decaying. It is also well known that propellant burn rate is affected by the operating pressure in the vessel in which it is contained, and this in turn affects the rate at which gases are evolved. Inasmuch as burn rate and gas evolution rate increase with an increase in pressure, and decrease with a decrease in pressure, we can utilize this phenomenon by enabling the duct connecting the gas generator with the nosetip to transmit the local pressure at the nosetip to the gas generator, thus to automatically regulate the coolant gas supply rate in a manner to accommodate properly, the coolant requirements at the nosetip.

It is therefore a primary object of our invention to provide a structure and cooling system for withstanding the great heat and highly erosive heating environment encountered in hypersonic flight.

It is another object of our invention to provide such a structure and system that is light in weight, yet sufficiently strong at elevated temperatures.

It is yet another object of our invention to provide a nosetip possessing a suitable amount of dust and water particle impact erosion resistance, that is cooled by the expulsion of coolant in the form of a gas.

It is still another object of our invention to provide a nosetip cooling arrangement in which the coolant is carried in a chemical form until the time of use, thus greatly reducing the weight and volume associated with prior art arrangements wherein a considerable amount of tankage was necessitated in order to carry the coolant utilized.

A further object of the invention to provide a nosetip with suitable impact erosion resistance, that is cooled by the expulsion of gas, and more particularly the high temperature gas from a gas generator, which is of course not normally regarded as a coolant.

A still further object of this invention is to provide a highly advantageous solid propellant gas generator for supplying coolant gases at high velocity, thus increasing the thickness of the boundary layer.

A yet further object of the invention is to provide an optional means of initiating said solid propellant gas generator by either a conventional initiator which ignites upon an electrical command signal, or an initiator which ignites by means of the ram pressure of the atmosphere at hypersonic velocities.

Another object of the invention is to provide a solid propellant gas generator for supplying coolant gases, in which such solid propellant is suitably configured in size, shape, chemistry, pressure coefficient and ignition characteristics as to provide coolant gases at the proper rates and times to match the coolant requirements of the aforementioned nosetip as hypersonic flight is undertaken.

Another object of the invention is to provide a suitable gas duct between the gas generator and the nosetip which, in addition to transporting the gases from the gas generator to the nosetip, will also transmit the local pressure from the nosetip to the gas generator so as to provide an automatically self-regulating control means at the rate at which the solid propellant gas generator burns and supplies coolant gases to the nosetip.

Another object of the invention is to provide a boot of easily melted material that seals the nosetip and duct until the energy presented by the atmosphere at hypersonic velocities removes the boot and allows the ram air to ignite the gas generator.

These and other objects, features and advantages of our invention will be more apparent as the description proceeds.

GENERAL DESCRIPTION OF THE DRAWINGS

DETAILED DESCRIPTION

Figure 1:
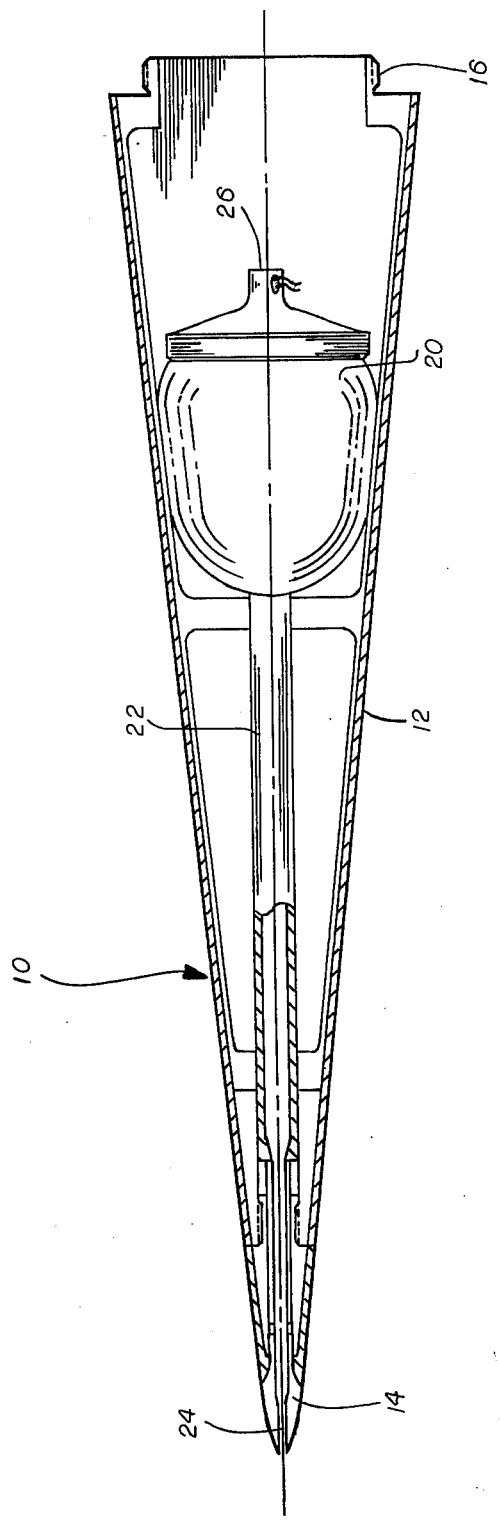
FIG. 1 is a cross-sectional view of a typical nosecone assembly in accordance with this invention, revealing the arrangement by which gases selectively evolved in a gas generator are carried forward and ejected at the nosetip for cooling purposes.

Turning now to FIG. 1, it will there be seen that we have shown a typical nosecone assembly 10 in accordance with this invention. The nosecone 12, within which certain other components are contained, is preferably made of silica, carbon, or other fiber reinforced ablation material covering a metal substructure, and being capable of withstanding the high temperature, highly erosive environment to be found in hypersonic flight.

Nosetip 14 is disposed at the forwardmost portion of the nosecone, and a connector arrangement 16 is provided at the opposite or rear end of the nosecone to enable the nosecone assembly to be affixed to the forward end of a hypersonic vehicle. The nosetip 14 is preferably made of suitable refractory type material, such as an alloy of tungsten that is capable of operating at elevated temperatures such as 3000° F to 5000° F for indefinite times, and that is also resistant to hypersonic rain and particle impact. However, above 6000° F, even this refractory material melts.

It will be noted in FIG. 1 that we have utilized a gas generator 20 in a location in the nosecone comparatively remote from the nosetip 14. In this embodiment, the gas generator means is a discrete vessel designed to supply large quantities of gas forwardly through gas duct 22, and thence through an orifice 24 located in the nosetip 14. Although we have shown a single orifice 24, we are of course not limited to this arrangement, and we may for example have a multiplicity of orifices in the nosetip arranged to disperse hot gases generated in the gas generator 20; see FIG. 7. The gas duct 22 is preferably made of two materials, an outer tubular structure capable of withstanding the loads imposed by the pressure of the gas in the duct, and an internal insulating member capable of withstanding the 2000° F temperature of the evolved gases and protecting the tubular structure from excessive temperatures.

The gas generator 20 in FIG. 1 is a pressure vessel preferably containing a solid propellant capable of generating the 2000° F gases utilized in accordance with this invention for protecting the nosetip. If uncooled, the nosetip would of course reach a temperature of greater than 6000° F during hypersonic flight. Although it is normally accepted practice to start a gas generator by use of an electrically powered igniter, such as igniter 26 shown in FIG. 1, it may be more advantageous to employ the operational environment for causing ignition. In other words, the solid propellant in gas generator 20 may be caused to ignite as a result of the ram air at the nosetip rising above a preascertained temperature, and being communicated via the duct means 22 to the generator means 20. Solid propellants typically used on gas generators have auto-ignition temperatures in the range of 700°–800° F and can therefore be readily ignited by the impingement of air at several thousand degrees Fahrenheit. One such propellant is Thiokol's TP-Q-3091C, which is a cooled polyester ammonium perchlorate.

As should now be obvious, the pressure generated at the nosetip, as the vehicle rams at hypersonic velocities through the atmosphere, is transmitted through the nosetip and duct 22, and thence to the gas generator 20. In accordance with another embodiment of this invention, the igniter 26 may involve a pressure-sensitive switch which closes in the presence of ram air at a preascertained pressure. The closing of the pressure-sensitive switch serves of course to complete an electrical circuit that causes the propellant to ignite and burn, thus supplying gases through the gas duct to exit from the orifice or orifices located at the nosetip.

Figure 2:
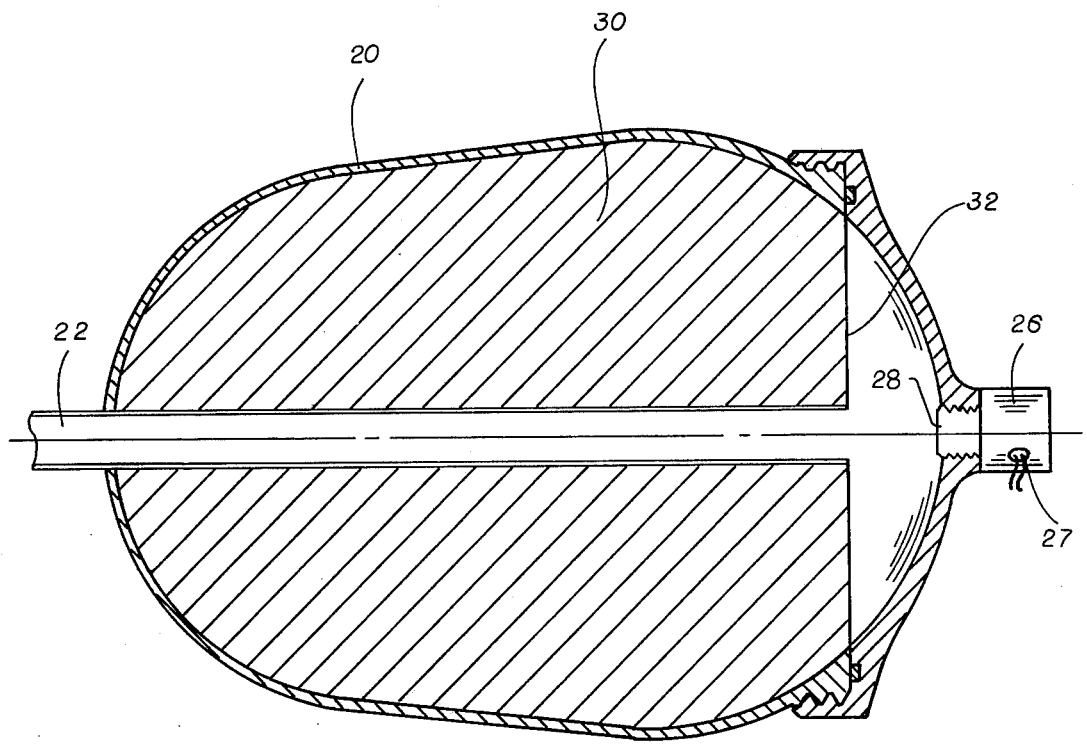
FIG. 2 is a cross-sectional view of a gas generator, revealing the use of solid propellant, and an igniter arrangement for selectively bringing about combustion of the propellant.

Referring to FIG. 2, a cross-sectional view of the gas generator 20 is shown, in the rear portion of which the igniter or initiator 26 is installed. In addition to the use of the auto-ignition procedure and the pressure-sensitive switch arrangement mentioned above, ignition of the propellant may also be brought about by utilizing an igniter that brings about ignition of the propellant upon an electrical signal being supplied to the electrical leads 27. Upon the occurrence of a command signal, the initiator causes the solid propellant 30 to ignite, with burning starting at surface 32 and producing large volumes of gases which proceed through the gas duct 22 to the nosetip 14. The shape and size of the solid propellant 30 is, of course, configured to produce cooling gases at the approximate rate required by the expected flight conditions.

As will be discussed at greater length hereinafter, as the vehicle proceeds through the atmosphere, being normally slowed down by the drag forces, the pressure at the nosetip as well as the heating rate normally rise and then decay, and as a consequence, the coolant flow requirement also rises and then decays. Because it is well known that the gas generator propellant burn rate and therefore the rate at which coolant gases are generated is sensitive to the local pressure with the rate increasing with increasing pressure and decreasing with decreasing pressure, this phenomenon is utilized in accordance with this invention by permitting the local pressure experienced at the nosetip to be transmitted through the gas duct to the gas generator so as to automatically regulate the coolant gas supply rate to accommodate the coolant requirements at the nosetip.

Figure 3:
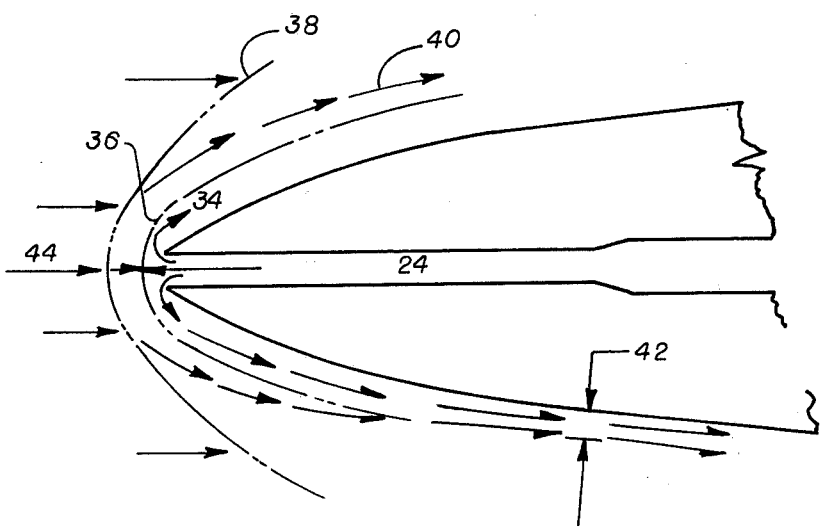
FIG. 3 shows a view of the flow, shock waves and mixing zone as such would appear forward of the nosetip when operating in the self-regulating mode, when the coolant flow is subsonic and the pressure sensitive burn rate of the gas generator is being affected by the free-stream ram air pressure.

Referring to FIG. 3, an enlarged cross-sectional view of the nosetip 14 is shown during a phase of hypersonic flight. In this instance, a single orifice 24 is shown, through which the gases from the gas generator can evolve. The gases flowing through the gas duct 22 then pass through the orifice 24 to the location 34 where they form a normal shock 36 upon encountering the atmosphere at hypersonic velocities. The normal shock 36 tends to push the bow shock 38 away from the surface of the nosetip, allowing a mixing zone 40 to be established which consists of a mixture of atmospheric gas and coolant gas. The result of the mixing zone 40 is to increase the thickness of the boundary layer 42 in a desirable manner, and to prevent the atmospheric gases 44 from excessively heating the surface of the nosetip 14.

It is to be realized that FIG. 3 depicts the bow shocks and flow conditions as they would appear when the coolant flow exiting from the nosetip is subsonic. Under these conditions, the ram pressure of the atmosphere affects and governs the pressure in the coolant flow duct, causing the coolant flow pressure to rise and fall as the ram pressure rises and falls. This change in coolant pressure, in turn, affects and governs the rate at which the solid propellant gas generator burns, so that the supply of coolant gases becomes automatically regulated and controlled by the coolant requirements that exist at the nosetip. In this way the size of the gas generator needed for a range of flight conditions can be minimized.

Figure 4:
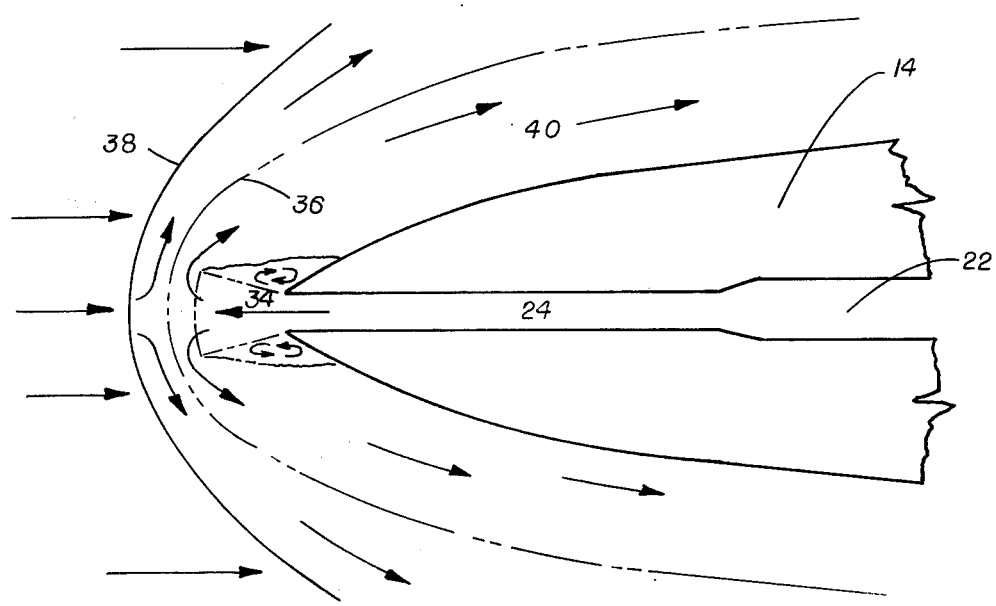
FIG. 4 shows an alternate condition, depicting the shock waves and mixing zone as these appear when operating in the non-regulating mode; that is, when the coolant flow is supersonic and the gas generator is operating independent of free stream ram air pressure, with the coolant supply rate being governed solely by the size and shape of the gas generator propellant grain.

FIG. 4 is similar to FIG. 3, except that it depicts the bow shocks and flow conditions as they would appear when the coolant flow existing from the nosetip is supersonic. This figure represents therefore an alternate design in which the coolant flow is not regulated by ram pressure of the atmosphere, but is controlled solely by the burning surface area of the gas generator, which is predetermined for a given flight condition by the size and shape of the solid propellant grain in the gas generator. With the coolant flow supersonic, the gas generator burns at a relatively constant pressure, unaffected by ram air pressure. The generated gases flowing through the gas duct 22 pass through the orifice 24 to the location 34 where they expand, forming shock structure 36 and pushing the bow shock 38 even further away from the surface of the nosetip. This serves to enlarge the mixing zone 40 and to increase coolant effectiveness, providing a margin above actual coolant needs. This alternate flow configuration is particularly advantageous for use in situations where coolant supply exceeds requirements.

Figure 5:
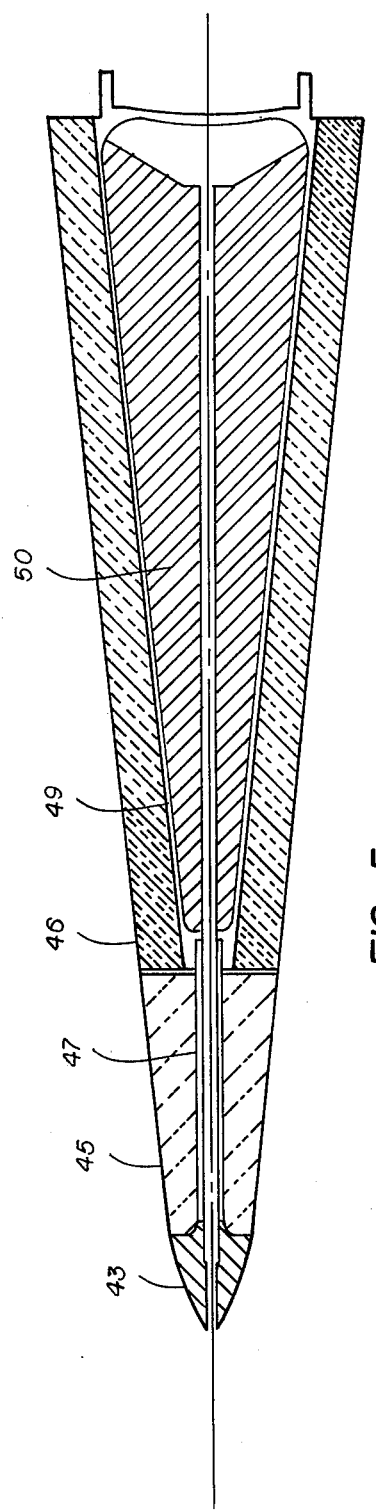
FIG. 5 shows a design of the gas cooled nosetip configuration that is more efficient for a certain trajectory application, this design embodying a thicker heat shield, an alternate gas generator grain shape and size, a simpler configuration of the duct arrangement between the gas generator and the nosetip, and thus a common structure to serve as both the gas generator housing and the nosecone.

Turning to FIG. 5, we here show an alternate design of a gas generator arrangements for providing coolant when needed for protecting the vehicle nosecone, such as during reentry or the like. The nosetip 43 is essentially the same as its counterpart in FIG. 1, but in the present embodiment we utilize a duct member 45 just aft of the nosetip, made of tantalum/tungsten or some high strength refractory alloy. The interior of member 45 is protected by a tubular-shaped insulating number 47, which serves to increase the working life of the member 45. The rear end of the insulator 47 interfits with the forward end of gas generator case 49, and is sealed thereto so as to able to effectively transmit the gases evolved by the propellant 50 forwardly through the duct member 45 and the nosetip 43.

As will be apparent from FIG. 5, we used a gas generator case 49 that is configured to conform to the shape of the nosecone, with this case serving both as the pressure vessel as well as the basic structure of the nosecone. Disposed around the gas generator case is an ablative material 46, such as silica.

The embodiment of our invention in accordance with FIG. 5 can utilize ignition means along the lines of those previously described, including of course the auto-ignition arrangement in which the heat of the ram air ignites the propellant 50, or else by a suitable igniter (not shown) that is operatively mounted in the base portion of case 49.

Figure 6:
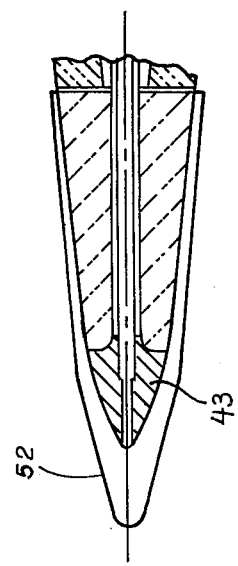
FIG. 6 shows an enlarged view of the nosetip with a protective boot in place.

FIG. 6 shows an enlarged view of the nosetip with a protective boot 52 in place. The protective boot 52 is made of a low melting point material, such as teflon, which is melted and removed by the energy of the atmosphere at hypersonic velocities, exposing the gas cooled nosetip in flight. The boot 52 protects the nosetip from damage and the orifice(s) and ducts from foreign material during transportation and handling.

Figure 7:
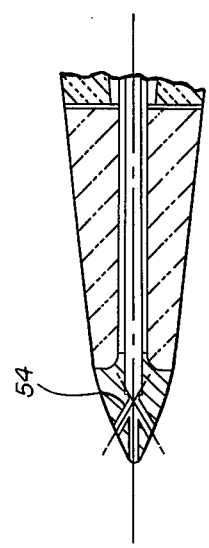
FIG. 7 shows an alternate nosetip configuration employing a plurality of cooling orifices, which allow the coolant gases to exit from several places distributed advantageously around the nosetip.

FIG. 7 shows an enlarged view of an alternate nosetip design having a plurality of orifices 54 advantageously placed around the nosetip to provide local cooling as required by individual flight trajectories and vehicle attitude. These additional orifices 54 may be of different sizes to distribute the coolant gases in the most efficient manner.

We claim:

1. An arrangement for protecting the nosecone of a vehicle during travel at hypersonic velocities, comprising a nosecone provided with a nosetip having orifice means, gas generator means in said vehicle in which comparatively large quantities of gases can be generated, said gas generator means containing a solid propellant, duct means for delivering such gases from said gas generator means to said orifice means, and means for bringing about on occasion, the generation of gases in said generator means, and consequently the flow of such gases from said orifice means.

2. The arrangement as defined in claim 1 in which the solid propellant contained in said gas generator means is caused to ignite as a result of the ram air at the nosetip rising above a preascertained temperature.

3. The arrangement as defined in claim 1 in which igniter means are utilized for selectively bringing about the generation of gases in said gas generator means, said igniter means being caused to function by a command electrical signal.

4. The arrangement as defined in claim 1 in which said means for bringing about the generation of gases in said gas generator means includes a pressure-sensitive igniter caused to function by exposure to at least some of the pressure rise at said nosetip.

5. The arrangement as defined in claim 1 in which said nosetip is made of refractory material having high strength characteristics, even when operating in the 2000° F to 5000° F range.

6. The arrangement as defined in claim 1 in which said solid propellant used in said gas generator is capable of producing gas at approximately 2000° F, such gas to be used for preventing a temperature rise at the nosetip, that is substantially above the temperature of the gas.

7. The arrangement as defined in claim 1 in which said duct means serves to communicate local pressure as well as pressure changes occurring at said nosetip to said gas generator, such pressure changes affecting the burn rate of the propellant in the gas generator, and thereby bringing about a self regulation of the burn rate of such propellant.

8. The arrangement as defined in claim 1 in which said gas generator means is a discrete vessel, disposed at a location comparatively remove from said nosetip.

9. The arrangement as defined in claim 1 in which said gas generator means is disposed comparatively close to said nosetip, and is of a configuration conforming to the shape of the interior of the missile nosecone.

10. The arrangement as defined in claim 9 in which said gas generator means serves as both a pressure vessel and as the basic structure of the nosecone.

11. The arrangement as defined in claim 1 in which a protective boot of low melting point material is normally disposed on said nosetip, which boot is melted and removed by the heat encountered during hypersonic flight.

12. An arrangement for protecting the nosecone of a vehicle when it encountered hypersonic velocities, comprising a nosecone provided with a nosetip having orifice means, gas generator means in said vehicle in which comparatively large quantities of gases can be generated, said gas generator means employing a solid propellant having the characteristic of producing gases in proportion to the pressure applied to its burning surface, duct means for delivering such gases from said gas generator means to said orifice means, said duct means serving as a communication means between the solid propellant, and the heat and pressure of the hypersonic environment, thus to provide both ignition of the propellant as well as control of the gases produced therefrom.

* * * * *